(12) United States Patent
Cumant (10) Patent No.: US 9,401,578 B2
(45) Date of Patent: Jul. 26, 2016

(54) DEVICE FOR FIXING AN ELECTRICAL CONNECTION TERMINAL TO A SUPPORT

(71) Applicant: DUBUIS ET CIE, Villebarou (FR)

(72) Inventor: Mickaël Cumant, Herbault (FR)

(73) Assignee: DUBUIS ET CIE, Villebarou (FR)

( * ) Notice: Subject to any disclaimer, the term of this patent is extended or adjusted under 35 U.S.C. 154(b) by 0 days.

(21) Appl. No.: 14/710,147

(22) Filed: May 12, 2015

(65) Prior Publication Data

US 2015/0244134 A1 Aug. 27, 2015

Related U.S. Application Data

(63) Continuation of application No. PCT/EP2013/072829, filed on Oct. 31, 2013.

(30) Foreign Application Priority Data

Nov. 12, 2012 (FR) ...................................... 12 60706

(51) Int. Cl.
| | |
|---|---|
| H01R 43/26 | (2006.01) |
| F16B 39/30 | (2006.01) |
| H01R 4/30 | (2006.01) |
| H01R 4/50 | (2006.01) |
| H01R 13/504 | (2006.01) |
| H01R 13/74 | (2006.01) |

(52) U.S. Cl.
CPC ................ *H01R 43/26* (2013.01); *F16B 39/30* (2013.01); *H01R 4/305* (2013.01); *H01R 4/307* (2013.01); *H01R 4/5025* (2013.01); *H01R 13/5045* (2013.01); *H01R 13/748* (2013.01); *Y10T 29/49208* (2015.01)

(58) Field of Classification Search
CPC .. H01R 11/12; H01R 12/585; H01R 13/6215; H01R 13/622
See application file for complete search history.

(56) References Cited

U.S. PATENT DOCUMENTS

| | | |
|---|---|---|
| 1,263,217 A | 4/1918 | Fine |
| 1,508,316 A | 9/1924 | Brune |
| 1,760,113 A | 5/1930 | Hoyt |
| 2,007,293 A | 7/1935 | Cayouette |
| 2,231,130 A | 2/1941 | Frithjof |

(Continued)

FOREIGN PATENT DOCUMENTS

| | | |
|---|---|---|
| DE | 2557130 A | 6/1977 |
| DE | 20102063 U | 6/2001 |

(Continued)

*Primary Examiner* — Truc Nguyen
(74) *Attorney, Agent, or Firm* — Michael P. Leary (57) ABSTRACT

A fixing device for fixing an electrical connection terminal to a support having a first side, a second side opposite to the first side, and defining a through hole of a first diameter. The fixing device comprises: a ring including a receiving portion partially defining an axial recess and insertable in the through hole; a dowel including an insert portion axially insertable into the recess of the ring and a locking portion axially spaced from the insert portion, the dowel partially defining an axial bore including an internal thread, and in the locking portion the internal thread of the bore is a distorted locking thread; and a fixing screw including a threaded shank engagable with the dowel. Tightening of the fixing screw draws the insert portion of the dowel axially into the recess of the ring, thereby radially expanding the ring into press-fit engagement with the through hole.

19 Claims, 4 Drawing Sheets

(56) References Cited

U.S. PATENT DOCUMENTS

| | | | |
|---|---|---|---|
| 2,243,515 A | 5/1941 | Sant | |
| 2,367,259 A | 1/1945 | Beach | |
| 2,402,159 A | 6/1946 | Hatan | |
| 2,452,192 A | 10/1948 | Hosking | |
| 2,596,885 A | 5/1952 | Booth | |
| 2,796,107 A | 6/1957 | Leo | |
| 2,923,339 A | 2/1960 | Skidmore | |
| 2,940,495 A | 6/1960 | Wing | |
| 3,103,962 A | 9/1963 | Neuschotz | |
| 3,145,751 A | 8/1964 | Sheridan | |
| 3,198,230 A | 8/1965 | Stover, III | |
| 3,265,109 A | 8/1966 | Herman | |
| 3,277,942 A | 10/1966 | Marion | |
| 3,311,147 A | 3/1967 | Walker | |
| 3,324,920 A | 6/1967 | Brown | |
| 3,340,920 A | 9/1967 | Johnson | |
| 3,391,721 A | 7/1968 | Rosan | |
| 3,441,073 A | 4/1969 | Johnson | |
| 3,552,257 A * | 1/1971 | Tanabe | F16B 37/16 411/368 |
| 3,683,989 A | 8/1972 | Follstaedt et al. | |
| 3,835,906 A | 9/1974 | Dietlein | |
| 4,145,075 A * | 3/1979 | Holzmann | H02G 3/0658 285/149.1 |
| 4,717,299 A | 1/1988 | Underwood | |
| 4,790,703 A | 12/1988 | Wing | |
| 4,793,822 A * | 12/1988 | Cozzens | H01R 4/2475 439/397 |
| 4,939,406 A * | 7/1990 | Jeschonneck | H02B 1/044 248/27.1 |
| 5,295,851 A * | 3/1994 | Bawa | F16L 5/12 439/271 |
| 5,498,110 A | 3/1996 | Stencel et al. | |
| 5,538,356 A | 7/1996 | Aarre et al. | |
| 5,746,609 A * | 5/1998 | Franks, Jr. | H01R 4/66 439/443 |
| 5,928,006 A * | 7/1999 | Franks, Jr. | H01R 4/36 439/443 |
| 6,231,357 B1 * | 5/2001 | Rumsey | H01R 13/53 439/95 |
| 6,406,192 B1 * | 6/2002 | Chen | H01R 13/6315 385/56 |
| 6,875,053 B2 * | 4/2005 | Fujii | H01R 4/64 439/567 |
| 7,104,805 B2 * | 9/2006 | Hjort | H05K 1/144 439/74 |
| 7,290,334 B2 | 11/2007 | Pettersen | |
| 7,462,043 B2 * | 12/2008 | Deisenhofer | H01R 4/646 411/149 |
| 7,513,719 B2 * | 4/2009 | Keiper | B23D 77/00 138/97 |
| 7,775,819 B2 * | 8/2010 | Bader | H01R 9/18 411/546 |
| 8,919,221 B2 * | 12/2014 | Chiou | F16C 1/102 174/520 |
| 2008/0279650 A1 | 11/2008 | Hauser | |
| 2012/0011702 A1 | 1/2012 | Pratt | |

FOREIGN PATENT DOCUMENTS

| | | |
|---|---|---|
| EP | 1376766 B | 6/2009 |
| GB | 1273146 B | 5/1972 |

* cited by examiner

DEVICE FOR FIXING AN ELECTRICAL CONNECTION TERMINAL TO A SUPPORT

CROSS-REFERENCE TO RELATED APPLICATIONS

This application is a continuation of PCT Application No. PCT/EP2013/072829, filed on Oct. 31, 2013 which claims priority from French Patent Application No. 1260706, filed on Nov. 12, 2012, the disclosure of which is incorporated herein by reference.

BACKGROUND OF THE INVENTION

The invention relates to a device for fixing an electrical connection terminal to a support.

In aircraft, some of the equipment has to be earthed. For this purpose, each item of equipment is electrically connected to the frame of the aeroplane, for example by means of metal braids or earthing wires. The ends of the metal braids or wires are received in terminals which are fixed to specific supports, the supports being mounted on the frame of the aeroplane.

In this field, fixing a terminal to a support is generally carried out by means of a screw and a nut, the terminal being held tightly between the head of the screw and a surface of the support.

In order to ensure good electrical contact between the terminal and the support, the surface of the support has to be stripped before the assembly of the screw and the nut. Once the assembly has been carried out, the stripped region of the support has to be protected against corrosion.

In addition, in order to ensure that the assembly has good resistance to vibrations, the nut is generally fixed to the support by means of rivets.

For the assembly of the screw and the nut, and for the placement of the rivets, access is required to the two sides of the support during assembly.

In addition, EP 1 376 766 in the name of the applicant discloses a device for fixing an electrical connection terminal to a support, the support being formed for example by the core of a railway rail. The device comprises a ring which is provided to be introduced into a cylindrical hole which is made in the support, a socket which is provided to be threaded in the ring and has a thread, and a threaded screw, the thread of which fits with the thread of the socket. When assembling the device, the ring is firstly positioned in the cylindrical hole in the support, and then a tensile force is exerted on the socket using a tool so as to introduce the socket into the ring with force, thereby causing radial expansion of the ring and locking of the ring in the hole. The screw is then screwed into the socket, the terminal being held tightly between the head of the screw and the ring, thus making it possible to fix the terminal to the support and to establish electrical contact between the terminal and the support.

An advantage of this fixing device is that it does not require the surface of the support to be stripped beforehand in order to ensure good electrical contact between the terminal and the support. This is because the electrical contact is produced between the ring and the inner surface of the cylindrical hole which is made in the support.

In addition, the fixing device has a reduced size.

Furthermore, in the case of the fixing device, access is not required to the two sides of the support during assembly.

However, a fixing device of this type is not traditionally used in applications which require resistance to vibrations, such as for earthing equipment on board an aircraft. This is because the vibrations to which the equipment is subjected can cause loosening of the screw which holds the terminal.

In order to prevent loosening of the screw, it would be possible to add a lock washer between the screw head and the support.

In any case, adding such a washer would result in an increase in the number of pieces forming the fixing device and in an increase in the weight of the fixing device which is unacceptable for the intended applications, said device being multiplied a large number of times in an aircraft.

BRIEF SUMMARY OF THE INVENTION

One object of the invention is to propose a device for fixing an electrical connection terminal to a support, which device is light and resistant to vibrations.

This object is achieved in the context of the present invention by means of a device for fixing an electrical connection terminal to a support, comprising a ring which is suitable for being received in a hole which is made in the support and a dowel which is suitable for being inserted with force in the ring in order to cause deformation of the ring so as to mount the ring in the hole, the dowel having a threaded bore which is suitable for receiving a fixing screw for fixing the terminal to the ring, the threaded bore having an internal thread with which an external thread of the screw engages, characterised in that the dowel comprises a locking portion in which the internal thread of the bore is distorted such that the engagement of the external thread of the screw with the internal thread of the bore in the locking portion causes locking of the screw in the dowel.

The term "distorted" describes a thread which initially has a circular, helical shape with a given pitch at the time of the production thereof by threading, but which has subsequently been permanently deformed such that it has for example a non-circular, helical shape or a modified pitch or a discontinuity. A permanent deformation of this type can be obtained by subjecting the dowel to compression in the locking portion. This step of compression is carried out at the factory during the production of the device.

When the fixing screw penetrates the locking portion, the engagement of the external thread of the screw with the internal thread of the bore tends to restore the initial shape of the thread, and therefore to deform the locking portion. The deformation of the locking portion produces a brake force on the external thread of the screw.

The locking portion thus makes it possible to prevent accidental loosening of the screw under the effect of vibrations which are imparted to the support or rotation of the terminal relative to the support.

The fixing device can also have the following features:
the locking portion has been subjected to compression in a radial direction relative to an axis of the bore,
in the locking portion, the internal thread of the bore has a multilobal, non-circular, helical shape,
the locking portion has been subjected to compression in two diametrically opposite regions,
the locking portion has been subjected to compression in three regions which are angularly distributed at 120° to one another around an axis of the bore,
the locking portion has been subjected to compression in four regions which are arranged in pairs symmetrically on either side of a plane of symmetry which passes through the axis of the bore,
the locking portion has been subjected to compression in an axial direction of the bore, the locking portion has one or more transverse slots that promoted the compression of the second portion in the axial direction of the bore, the ring has a receiving portion, and the dowel comprises an insertion portion which is suitable for being inserted with force in the receiving portion of the ring in order to cause the deformation of the ring, the insertion portion of the dowel has an outer surface which has a substantially conical shape, the receiving portion of the ring has an inner surface which has a substantially conical or cylindrical shape, once the dowel has been inserted with force in the receiving portion of the ring, the locking portion of the dowel projects outside the receiving portion, the dowel has a wall surrounding the bore, the wall having, in the locking portion, a thickness which is less than a thickness of the wall in the insertion portion, the ring is made of a first material and the dowel is made of a second material, the first material having a hardness which is less than the hardness of the second material, the ring is made of aluminium alloy or copper, and the dowel is made of aluminium alloy, titanium or steel, the dowel has a shoulder which is suitable for abutting against the ring in order to limit the insertion of the dowel into the ring, the ring has a shoulder which is suitable for being supported against a surface of the support on a first side of the support, whereas the locking portion of the dowel extends from a second side of the support, which is opposite the first side, the dowel is formed from a single piece of material.

The invention also relates to a method for producing a fixing device of the type defined above, comprising a step of producing the dowel which consists in permanently deforming a portion of the dowel by applying a deformation force to the dowel, the deformed portion of the dowel forming the locking portion of the dowel.

The deformation force can be applied by compressing the portion to be deformed of the dowel, for example by means of a clamping tool or a press or even by means of one or more balls which are supported against an outer surface of the dowel in the portion to be deformed.

BRIEF DESCRIPTION OF THE DRAWINGS

Other features and advantages will become apparent from the following description, which is given purely by way of illustrative and non-limiting example and is to be read in relation to the accompanying drawings, in which.

DETAILED DESCRIPTION OF THE PREFERRED EMBODIMENTS

Figure 1:
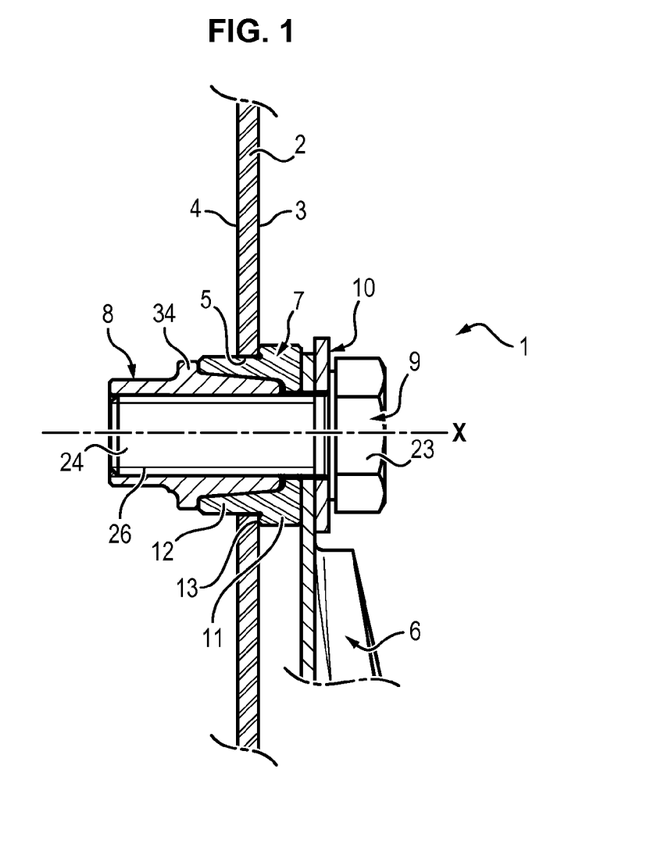
FIG. 1 is a schematic, longitudinal sectional view of a fixing device according to the invention, when mounted on a support.

In FIG. 1, the fixing device 1 is shown when mounted on a support 2. The support 2 in this case is a thin metal wall, such as a wall of a frame of an aircraft. The wall 2 is for example made of aluminium alloy. The wall 2 has a generally planar shape with a first side 3 and a second side 4, which is opposite the first side 3. The wall 2 is provided with a through-hole 5 which is intended to receive the fixing device 1 in order to fix an electrical connection terminal 6 to the wall 2.

The fixing device 1 comprises a ring 7, a dowel 8, a screw 9 and a washer 10.

The screw 9 comprises a head 23 and a threaded shank 24.

The terminal 6 is held tightly between the washer 10 and the ring 7, the head 23 of the screw 9 pressing the terminal against the ring 7 via the washer 10.

Figure 2A:
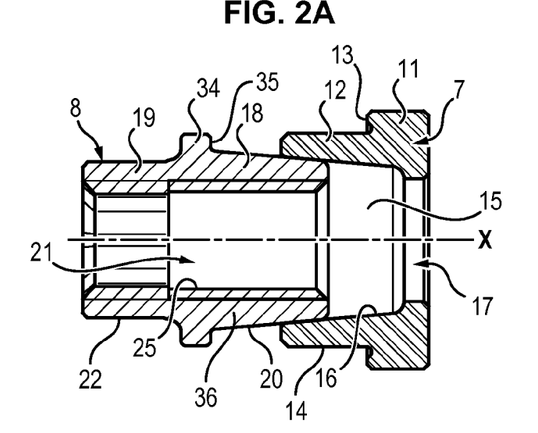
FIGS. 2A and 2B are schematic views of a ring and dowel assembly before mounting on the support, said views being a longitudinal section and a cross-sectional view respectively, according to a first embodiment of the invention.
Figure 2B:
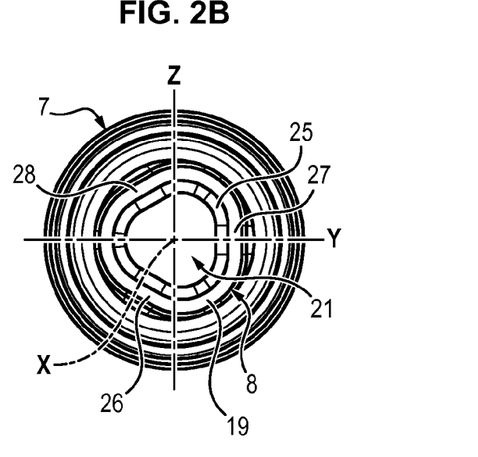

FIGS. 2A and 2B are schematic views of a ring 7 and dowel 8 assembly according to a first embodiment of the invention, the assembly being shown before mounting on the support 2.

The ring 7 is made of metal, preferably of aluminium alloy or copper. The ring 7 has a first portion 11 (or collar) which is suitable for being placed in electrical contact with the terminal 6, and a second portion 12 which is suitable for being inserted in the hole 5 through the wall 2. The ring 7 comprises a shoulder 13 connecting the first portion 11 and the second portion 12, the shoulder 13 being suitable for being supported against a surface of the wall 2, on the first side 3 of the wall 2 when the ring 7 is positioned in the hole 5.

The first portion 11 of the ring 7 has a hole 17 which makes it possible to insert the screw 9 through the ring 7, from the first side 3 of the wall 2 when the ring 7 is positioned in the hole 5.

The second portion 12 has an outer surface 14 which is suitable for being in contact with the inner surface of the hole 5 when the ring 7 is positioned in the hole 5. The outer surface 14 of the second portion 12 has a generally cylindrical shape of revolution. The second portion 12 further has a recess 15 which opens into a side of the ring 7 which is opposite the first portion 11. The recess 15 has an inner surface 16 which has a generally conical shape having an internal diameter which decreases as it nears the first portion 11. Alternatively, the inner surface 16 could have a generally cylindrical shape.

The dowel 8 is made of metal, preferably of aluminium alloy, titanium or steel. The metal forming the dowel 8 has a hardness which is greater than that of the material forming the ring 7.

The dowel 8 comprises a first portion 18 (or insertion portion) which is suitable for being inserted in the recess 15 in the ring 7 and a second portion 19 (or locking portion) which is suitable for projecting outside the recess 15 once the dowel 8 is inserted in the ring 7.

The first portion 18 has an outer surface 20 which has a generally conical shape and an external diameter which decreases as it moves away from the second portion 19. The outer surface 20 of the first portion 18 of the dowel 8 and the inner surface 16 of the recess 15 of the ring 7 thus have complementary shapes. The complementary nature of the shapes makes it possible to obtain homogenous (uniform) contact between the outer surface 20 and the inner surface 16 during the insertion of the dowel 8 in the recess 25, and therefore to obtain homogenous deformation of the second portion 12 of the ring 7 (the second portion 12 of the ring 7 retains a cylindrical shape during the deformation).

The first portion 19 also comprises a locking ring 34 which projects from the outer surface 20 and forms a shoulder 35 connecting the outer surface 20 to the ring 34. The locking ring 34 is positioned at the connection between the first portion 18 and the second portion 19.

The first portion 18 of the dowel 8 is suitable for being inserted with force in the recess 15, the insertion having the effect of causing deformation of the ring 7 so as to mount the ring 7 in the hole 5 in the wall 2. Since the material forming the dowel 8 is harder than the material forming the ring 7, only the ring 7 is deformed.

The shoulder 35 is suitable for abutting against the ring 7 so as to limit the insertion of the first portion 18 of the dowel 8 into the recess 15.

The second portion 19 of the dowel 8 extends in the extension of the first portion 18, but has a thinner dimension than the first portion 18. More specifically, the second portion 19 of the dowel 8 has an outer surface 22 which has a radial dimension which is less than an external diameter of the first portion 18.

The dowel 8 also has a threaded bore 21 having a longitudinal axis X, the bore 21 being suitable for receiving the screw 9 in order to fix the terminal 6 to the ring 7 and to hold the dowel 8 in position in the ring 7. The bore 21 extends through the dowel 8 in a longitudinal direction of the dowel 8, over the entire length of the dowel. In particular, the bore 21 extends continuously through the first portion 18 and through the second portion 19 of the dowel 8.

In addition, the dowel 8 has a wall 36 which surrounds the bore 21, the wall 36 having, in the first portion 18, a first thickness ($T_1$) which is greater than a second thickness ($T_2$) of the wall 36 in the second portion 19. This feature has the effect of promoting deformation of the wall of the dowel in the second portion 19, whilst protecting the second portion 19 against deformation during the insertion of the screw 9 in the bore 21.

In addition to the stop function thereof, the ring 34 also makes it possible to rigidify the second portion 19 to protect the second portion against deformation. In particular, the ring 34 forms a region having a greater thickness which prevents propagation of the deformation imposed on the second portion 19 towards the first portion 18.

The bore 21 of the dowel 8 has an internal thread 25 which can cooperate with an external thread 26 of the shank 24 of the screw 9. The internal thread 25 extends continuously in the first portion 18 and in the second portion 19 of the dowel 8.

In any case, as is shown in FIG. 2B, the second portion 19 of the dowel 8 is distorted. The second portion 19 has a non-circular cross section because it has been permanently radially deformed. As a result, in the second portion 19, the bore 21 also has a non-circular cross section.

More specifically, the second portion 19 has been radially deformed in three regions 26, 27, 28 which are angularly distributed at 120° to one another around the axis X of the bore 21, such that the dowel 8 has a generally trilobal cross section in the locking portion 19.

In addition, as a result of this permanent deformation, in the second portion 19, the internal thread 25 of the bore 21 has distortions (in this case, the thread 25 has a non-circular, helical shape), whereas in the first portion 18, the internal thread 25 of the bore 21 has no distortion (that is to say that the thread 25 has a circular, helical shape). Due to this distortion, the thread 25 is suitable for generating, in the regions 26, 27, 28, a frictional force on the external thread 26 of the screw 9 when the screw 9 is screwed into the dowel 8.

The radial deformation of the second portion 19 can be obtained by compressing the second portion 19, for example by means of a hydraulic clamping tool. The compression of the second portion 19 causes permanent radial deformation of the second portion 19 of the dowel 8.

Alternatively, the radial deformation of the second portion 19 can be obtained by introducing with force the second portion 19 of the dowel 8 into a specific tool, the tool having a bore for guiding the dowel, and a plurality of balls which are held in a cage, the balls projecting into the bore of the tool.

The application of the balls against the outer surface 22 of the dowel 8 causes permanent radial deformation of the second portion 19 of the dowel 8.

FIGS. 3 to 6 are schematic views of the steps of a method for mounting the fixing device 1 on a wall 2.

Figure 3:
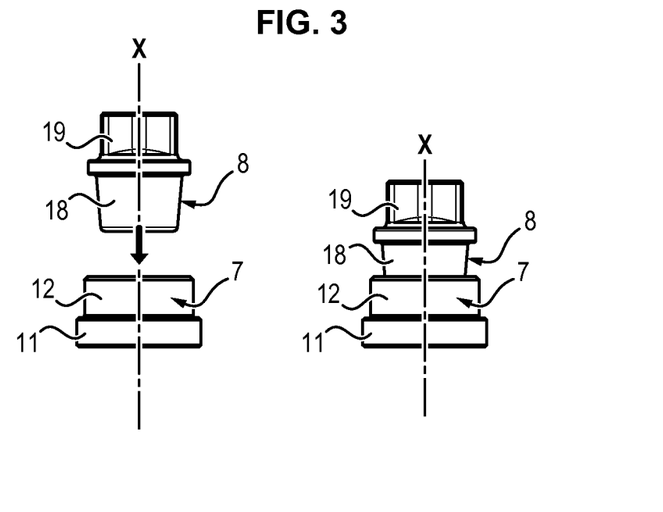
FIGS. 3 to 6 are schematic views of the steps of a method for assembling the fixing device.

According to a preliminary step which is shown in FIG. 3, the ring 7 and the dowel 8 are preassembled. The first portion 18 of the dowel 8 is inserted in the second portion 12 of the ring 7, so as to rigidly interconnect the ring 7 and the dowel 8. This step of preassembly is carried out at the factory during the production of the device.

Figure 4:
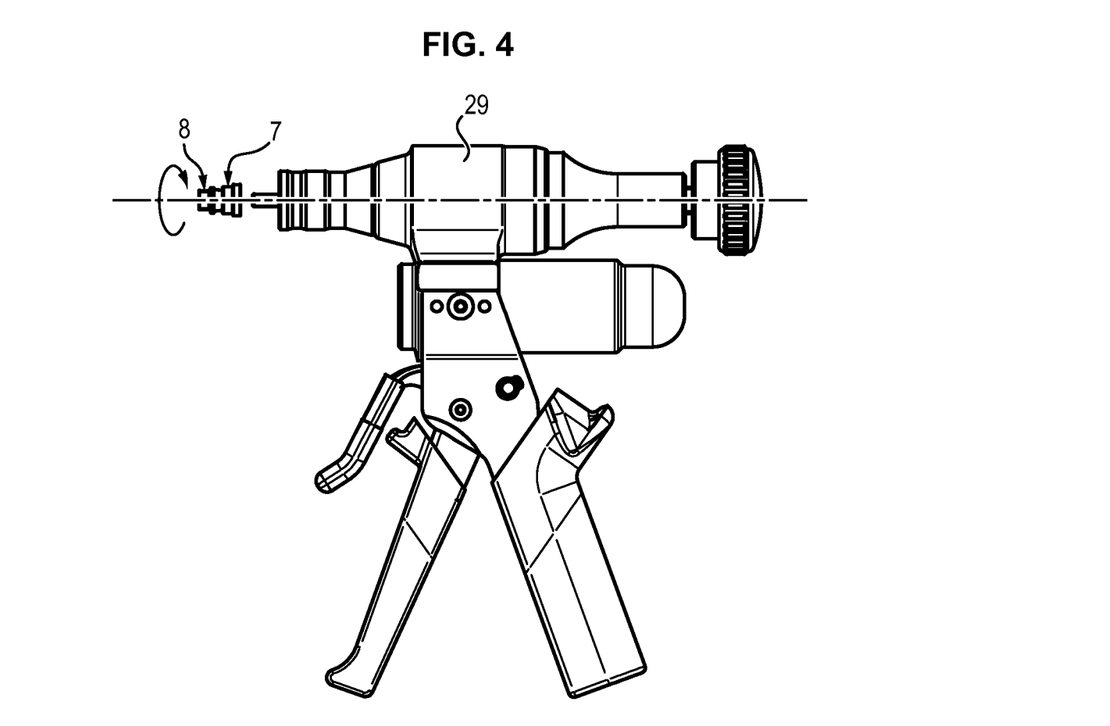
Figure 5:
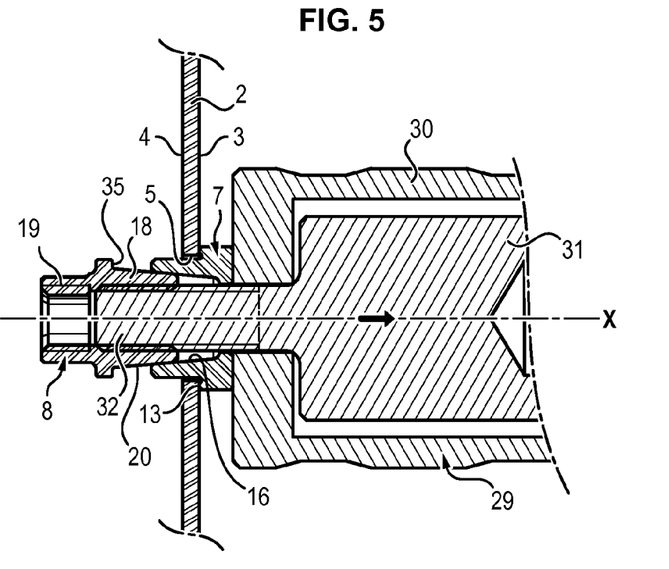

According to a first step which is shown in FIG. 4, the preassembled ring 7 and dowel 8 assembly is screwed onto a mounting tool 29. As can be seen in FIG. 5, the tool 29 comprises a cylinder 30 and a piston 31 which is slidably mounted inside the cylinder 30. The piston 31 has a threaded rod 32 which is inserted through the hole 17 in the ring 7 and screwed inside the threaded bore 21 of the dowel 8.

The threaded rod 32 is only screwed into the first portion 18 of the dowel 8, in which the internal thread 25 of the bore 21 is not distorted.

According to a second step shown in FIG. 5, the preassembled ring 7 and dowel 8 assembly is positioned in the hole 5 in the support 2, the shoulder 13 of the ring 8 being supported against the surface of the first side 3 of the wall 2. It should be noted that the greatest transverse dimension of the dowel 8 is less than or equal to a transverse dimension of the second portion 12 of the ring 7, so as to allow the ring 7 and dowel 8 assembly to be inserted in the hole 5 from the first side 3 of the support 2.

In this position, the dowel 8 is located on the second side 4 of the wall 2. The tool 29 is operated so as to cause a movement of the piston 31 inside the cylinder 30. The movement of the piston 31 inside the cylinder 30 has the effect that the piston 31 exerts a tensile force on the dowel 8 in a direction which is parallel to the axis X, which pulls the dowel 8 further inside the ring 7 (that is to say pulling dowel 8 towards collar 11). Due to the conical shapes of the surfaces 16 and 20, the penetration of the dowel 8 inside the ring 7 causes radial expansion of the ring 7. The ring 7 is thus press-fit mounted in the hole 5 in the wall 2.

In any case, the insertion of the dowel 8 into the ring 7 is limited by the shoulder 35 which abuts against the ring 7.

Figure 6:
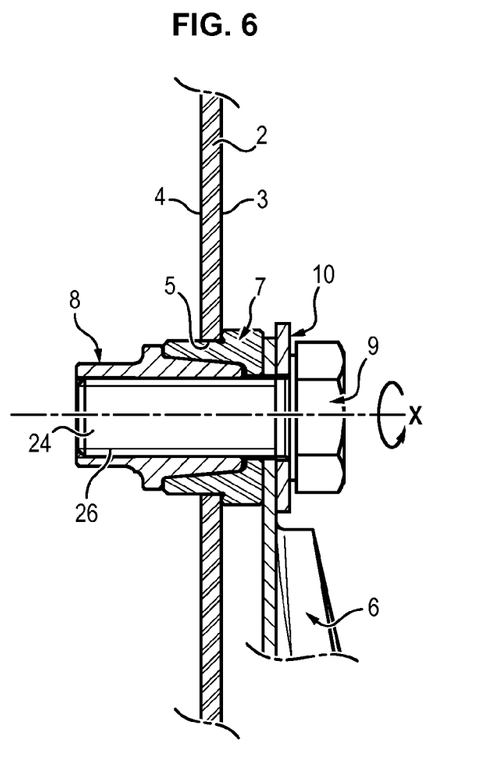

According to a third step which is shown in FIG. 6, the mounting tool 29 is unscrewed from the ring 7 and dowel 8 assembly. The shank 24 of the screw 9 is then inserted through the hole 17 in the ring 7 and screwed into the threaded bore 21 of the dowel 8, in order to fix the terminal 6 and the washer 10 to the ring 7 and dowel 8 assembly. During the screwing, the external thread 26 of the shank 24 of the screw 9 engages with the internal thread 25 of the bore 21 in the first portion 18 and in the second portion 19 successively.

Since the internal thread 25 is distorted in the second portion 19, the engagement of the external thread 26 in the internal thread 25 causes radial elastic deformation of the second portion 19 (or locking portion). In other words, the second portion 19 of the dowel 8 is elastically deformed under the effect of the external thread 26 of the screw 9. This has the effect of generating a frictional force on the external thread 26 of the screw 9, thereby preventing subsequent loosening of the screw 9 due to the vibrations of the wall 2 or rotation of the terminal 6 relative to the wall 2. The screw 9 is thus locked in the dowel 8.

It should be noted that the fixing device 1 which has just been described can be mounted on a support, without access being required to the two sides 3 and 4 of the support. This makes it possible for example to fix the terminal 6 directly to a wall 2 of the frame of an aircraft, without needing to use an additional specific support which is fixed to the wall 2.

In addition, since it is not necessary to access the two sides of the support, the device 1 can be mounted in a blind fixing hole.

Figure 7A:
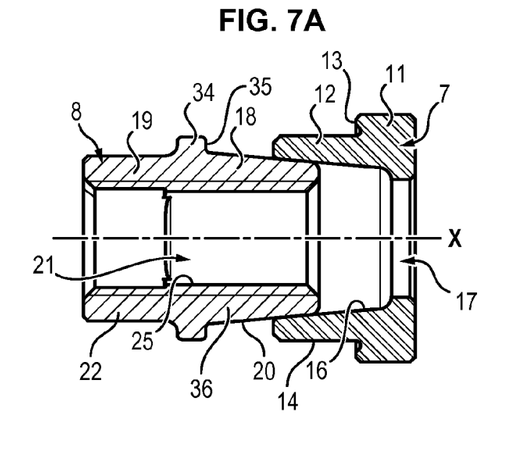
FIGS. 7A and 7B are schematic views of a ring and dowel assembly before mounting on the support, said views being a longitudinal section and a cross-sectional view respectively, according to a second embodiment of the invention.
Figure 7B:
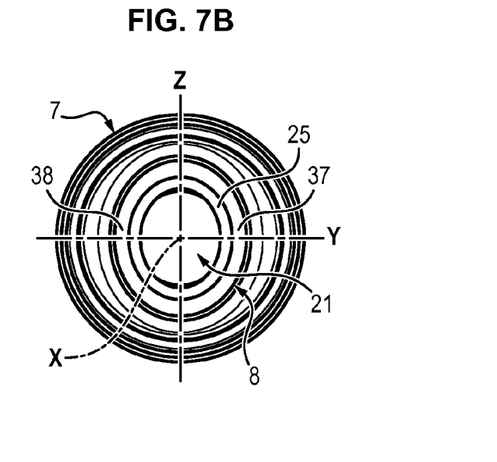

FIGS. 7A and 7B are schematic views of a ring 7 and dowel 8 assembly according to a second embodiment of the invention.

This second embodiment is the same as the first embodiment except for the fact that the second portion 19 of the dowel 8 has been radially deformed in two diametrically opposite regions 37, 38. In this case, the dowel 8 has an oblong-shaped or bilobal cross section in the locking portion 19.

Due to this distortion, the internal thread 25 is suitable for generating, in the regions 37, 38, a frictional force on the external thread 26 of the screw 9 when the screw 9 is screwed into the dowel 8.

Figure 8A:
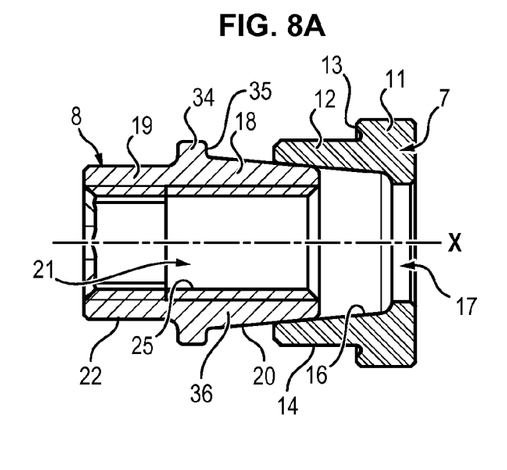
FIGS. 8A and 8B are schematic views of a ring and dowel assembly before mounting on the support, said views being a longitudinal section and a cross-sectional view respectively, according to a third embodiment of the invention.
Figure 8B:
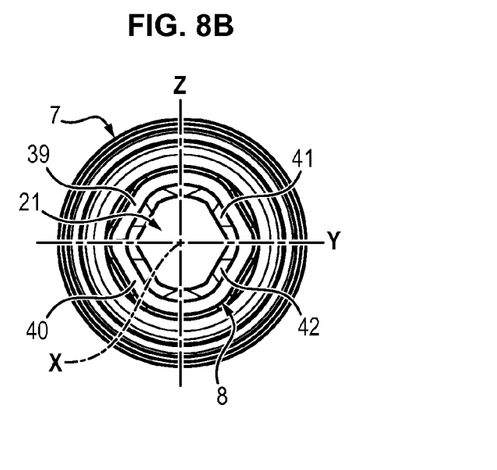

FIGS. 8A and 8B are schematic views of a ring 7 and dowel 8 assembly according to a third embodiment of the invention.

This third embodiment is the same as the first embodiment except for the fact that the second portion 19 of the dowel 8 has been radially deformed in four regions 39 to 42 which are arranged in pairs symmetrically on either side of a plane of symmetry Z which passes through the axis X of the bore. In this case, the dowel 8 has a quadrilobal cross section in the locking portion 19.

Due to this distortion, the internal thread 25 is suitable for generating, in the regions 39 to 42, a frictional force on the external thread 26 of the screw 9 when the screw 9 is screwed into the dowel 8.

Figure 9A:
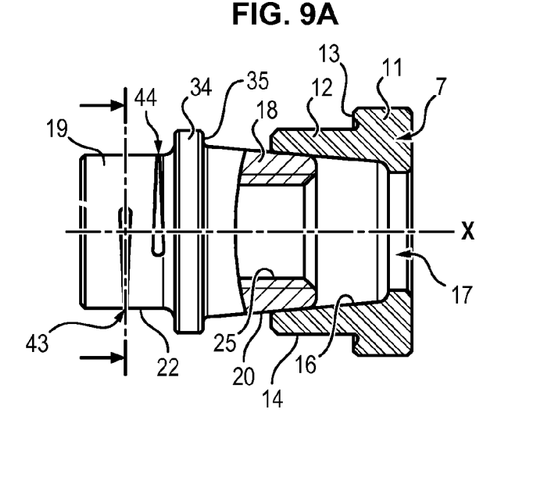
FIGS. 9A and 9B are schematic views of a ring and dowel assembly before mounting on the support, said views being a partial longitudinal section and a cross section respectively, according to a fourth embodiment of the invention.
Figure 9B:
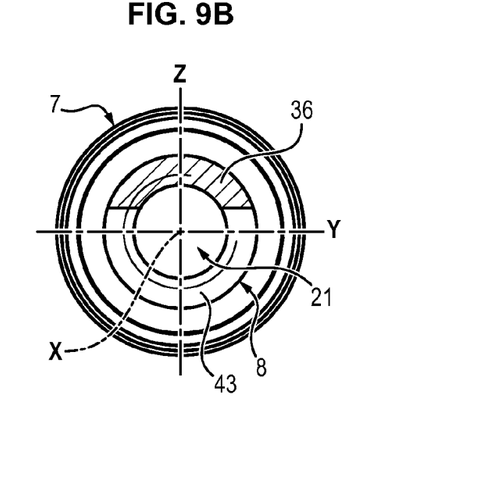

FIGS. 9A and 9B are schematic views of a ring 7 and dowel 8 assembly according to a fourth embodiment of the invention.

In this fourth embodiment, the second portion 19 comprises two transverse slots 43 and 44 which are made through the wall 36 of the dowel 8. Each slot 43, 44 extends in parallel with a plane which is orthogonal to the axis X of the bore. In addition, the slots 43 and 44 extend from two opposite sides of the wall 36, on either side of the axis X. Each slot 43, 44 extends over more than half of a cross section of the second portion 19.

After the second portion 19 has been split along the two slots 43 and 44, the second portion 19 of the dowel 8 is permanently deformed by compressing the second portion 19 in parallel with the axis X of the bore.

The axial deformation of the second portion 19 can be obtained by compressing the second portion 19, for example by means of a hydraulic press. The compression of the second portion 19 causes permanent axial deformation of the second portion 19 of the dowel 8.

The slots 43 and 44 form regions of low resistance promoting axial deformation of the second portion 19 under the effect of the compressive force which is applied to the dowel 8 in parallel with the direction X.

Under the effect of this compressive force, the slots 43 and 44 are closed slightly, and the parts of material of the second portion 19 which are located on either side of the slots 43 and 44 are brought closer together.

Closing the slots 43 and 44 and bringing together the parts of material which are located on either side of the slots 43 and 44 leads to a local reduction in the pitch of the internal thread 25 of the bore 21 in the second portion 19.

The engagement of the external thread 26 of the screw 9 in the distorted internal thread 25 causes axial elastic deformation of the locking portion 19. In other words, the locking portion 19 of the dowel 8 is elastically deformed under the effect of the external thread 26 of the screw 9. As a result, a frictional force is generating on the external thread 26 of the screw 9, thereby preventing subsequent loosening of the screw 9 due to vibrations of the wall 2 or rotation of the terminal 6 relative to the wall 2. The screw is thus locked in the dowel 8.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A fixing device for fixing an electrical connection terminal to a support having a first side, a second side opposite to the first side, and defining a through hole of a first diameter; the fixing device comprising
   a ring including a receiving portion partially defining an axial recess and insertable in the through hole of the support, and
   a dowel including an insert portion axially insertable into the recess of the ring and a locking portion axially spaced from the insert portion, the dowel partially defining an axial bore including an internal thread, and in the locking portion the internal thread of the bore is a distorted locking thread.

2. A fixing device according to claim 1 and further comprising a fixing screw including a shank and an external thread, the shank threadably engagable with the dowel.

3. A fixing device according to claim 2, wherein the engagement of the external thread of the screw with the distorted locking thread of the bore in the locking portion causes locking of the screw in the dowel.

4. A fixing device according to claim 1, wherein, in the locking portion, the distorted locking thread has a multilobal, non-circular, helical shape.

5. A fixing device according to claim 4, wherein the distorted locking thread includes two diametrically opposite regions of reduced internal radius.

6. A fixing device according to claim 4, wherein the distorted locking thread includes three regions of reduced internal radius, the three regions angularly distributed at 120° to one another around an axis of the bore.

7. A fixing device according to claim 4, wherein the distorted locking thread includes four regions of reduced internal radius, the four regions arranged in pairs symmetrically on either side of a plane of symmetry which passes through the axis of the bore.

8. A fixing device according to claim 1, wherein the locking portion has been subjected to compression in an axial direction of the bore.

9. A fixing device according to claim 8, wherein the locking portion includes a radially transverse slot that promotes the compression of the locking portion in the axial direction of the bore.

10. A fixing device according to claim 1, wherein the insert portion of the dowel includes a substantially conical shaped outer surface.

11. A fixing device according to claim 1, wherein the receiving portion of the ring has an inner surface which is one of substantially conically and cylindrically shaped.

12. A fixing device according to claim 1, wherein, when the insert portion of the dowel is located in the receiving portion of the ring, then the locking portion of the dowel projects axially outside the receiving portion.

13. A fixing device according to claim 1, wherein the dowel includes a wall radially defining the bore, and the wall in the insert portion defines a first thickness and in the locking portion the wall defines a second thickness less than the first thickness.

14. A fixing device according to claim 1, wherein the ring is made of a first material having a first hardness, and the dowel is made of a second material having a second hardness, and the second hardness is less hard than the first hardness.

15. A fixing device according to claim 1, wherein the ring is made of one of aluminium alloy and copper, and the dowel is made of one of aluminium alloy, titanium, and steel.

16. A fixing device according to claim 1, wherein the dowel further includes a shoulder operable for abutting against the ring in order to limit the insertion of the dowel into the ring.

17. A fixing device according to claim 1, wherein the ring further includes a shoulder operable for acting against the first side of the support in order to position the ring axially in the through hole with the locking portion of the dowel extending perpendicularly from the second side of the support.

18. A method for assembling an electrical connection terminal to a support having a first side, a second side opposite to the first side, and defining a through hole of a first diameter; the method comprising the steps of:
  Providing a fixing device comprising:
    a ring including a receiving portion partially defining an axial recess, and
    a dowel including an insert portion and a locking portion axially spaced from the insert portion, the dowel partially defining an axial bore including an internal thread, and in the locking portion the internal thread of the bore is a distorted locking thread;
  Inserting the insert portion of the dowel axially into the recess of the ring to form a preassembly;
  Mounting the preassembly to a setting tool by engaging the tool to the internal thread of the dowel;
  Positioning the preassembly in the through hole of the support from the first side so that the receiving portion of the ring is within the through hole and the locking portion of the dowel projects perpendicular from the second side of the support;
  Operating the tool and pulling the dowel axially toward the tool;
  Forcing the dowel deeper into the recess of the ring;
  Radially expanding the receiving portion of the ring by the action of the dowel moving deeper into the recess of the ring;
  Forming a press-fit connection between the ring and the support by the radial expansion of the receiving portion against the through hole; and
  Disengaging the tool from the preassembly by unscrewing the tool from the internal thread of the dowel.

19. A method for assembling an electrical connection terminal to a support according to claim 18 wherein the step of providing a fixing device further includes providing a fixing screw, including a shank and an external thread; and an electrical connection terminal; and the method further comprising the steps of:
  Inserting the fixing screw through the ring into the bore of the dowel;
  Screwing the fixing screw axially into the dowel;
  Capturing the electrical connection terminal between the fixing screw and the ring; and
  Deforming the locking portion of the dowel by the interaction of the screw thread and the distorted locking thread to form a loosening resistant connection between the dowel and screw.

* * * * *